J. LYTCH.
Cotton Scraper.

No. 104,396. Patented June 14, 1870.

Witnesses
Chas. E. Upperman
P. A. Devine

Inventor
James Lytch
By his Attorneys,
Upperman & Johnson.

UNITED STATES PATENT OFFICE.

JAMES LYTCH, OF LAURINBURG, NORTH CAROLINA.

IMPROVEMENT IN COTTON-SCRAPERS.

Specification forming part of Letters Patent No. 104,396, dated June 14, 1870.

*To all whom it may concern:*

Be it known that I, JAMES LYTCH, of Laurinburg, in the county of Richmond and State of North Carolina, have invented certain new and useful Improvements in Cotton-Scrapers; and I do hereby declare the following to be a full, clear, and exact description thereof, reference being had to the accompanying drawings of the same, which make part of this specification, and in which—

Figure 1:
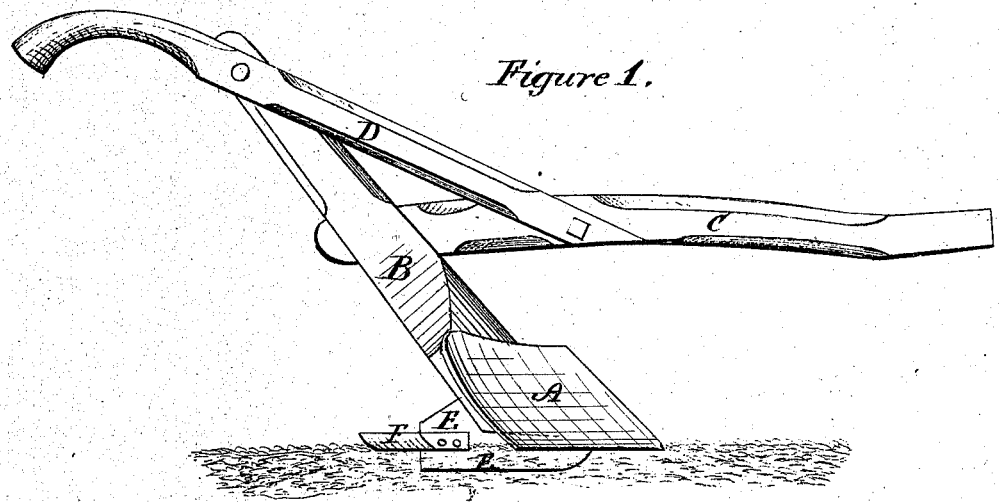
Figure 2:
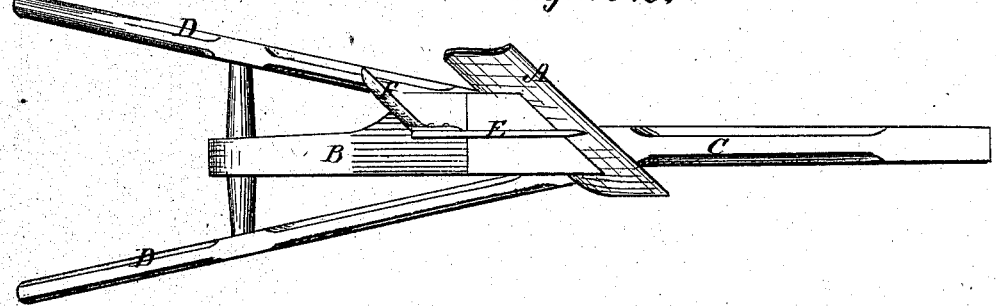
Figure 3:
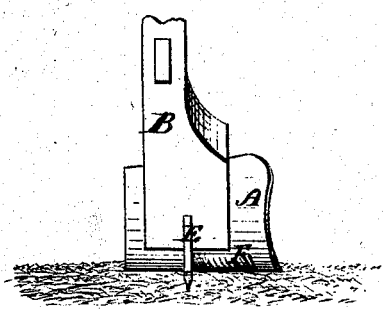

Figure 1 represents a side elevation of a cultivator embracing my improvements. Fig. 2 represents a bottom view of the same, and Fig. 3 a rear view thereof.

My improvements consist in the arrangement of a fixed guide-plate secured to the rear of the cultivator, so as to project therefrom in the rear of and beneath the cutting-edge of the share in such manner as to enter the soil and serve as a guide to the cultivator, for the purpose of preventing its liability to be thrown out of its direct line, and thus protect the cotton-plants from accidental injury from the irregular motion of the share, and in connection therewith the arrangement of a supplemental scraper attached to and projecting from said guide-plate obliquely in the rear of the share, so as to act in conjunction with the latter to direct the loosened soil toward the row of plants, and to cut and turn up any weeds or grass that the forward share may slip over.

In the accompanying drawings, A represents the share or mold-board of the cultivator, of any suitable form and size, secured to the standard B, so as to be replaced by others when necessary. The standard is secured and braced to the beams C, and the cultivator is provided with handles D in the usual manner.

The guide E, which constitutes my invention, consists of a wrought-iron plate, sharpened where it enters the soil, and secured in the lower end of the standard of the cultivator by rivet-bolts or other suitable means, so as to firmly brace it thereto. This guide E is arranged parallel with the beam, and is located near the middle of the length of the share, and forms an acute angle therewith. It projects below the cutting-edge of the share a suitable distance to enter the soil not cut by the share, and extends from the cutting-edge of the latter a sufficient distance in the rear of the standard to give it length enough to form a brace in the earth, to prevent any lateral movement of the share while moving through the soil; and in order that it may pass readily over any obstruction encountered by the share it is curved at its connection therewith. In order to still further cut the grass and weeds and direct the soil loosened by the share to the row of plants, and to loosen any part which the share may override, I attach a small supplemental arm or share, F, to the heel of the fixed guide-plate E, riveted thereto, and extending obliquely rearward therefrom on a level with the cutting-edge of the front share, A, and a distance equal, or nearly so, to the inner edge of the mold-board, so as to gather up and carry toward the plants the loosened soil, or cut and loosen any which the front share may accidentally pass over, so that while the wrought-iron center plate, E, serves as a guide to the cultivator it also forms a fixed attachment for the auxiliary cutter F, and thus serves two important functions in a cotton scraper or cultivator, the advantages of which I have found to be of great importance, as the cultivation of cotton-plants requires the greatest care, because the slightest bruising of the roots tends to kill the plants or to render their growth imperfect.

Having described my invention, I claim—

The arrangement of the fixed central guide-plate, E, so as to project below the cutting-edge of the share A, to steady and hold the latter in the soil, in connection with the auxilary scraper F, in the manner and for the purpose herein shown and specified.

JAMES LYTCH.

Witnesses:
T. H. UPPERMAN,
T. S. GENIN,